(12) United States Patent
Sun et al.

(10) Patent No.: US 11,144,817 B2
(45) Date of Patent: Oct. 12, 2021

(54) DEVICE AND METHOD FOR DETERMINING CONVOLUTIONAL NEURAL NETWORK MODEL FOR DATABASE

(71) Applicant: FUJITSU LIMITED, Kawasaki (JP)

(72) Inventors: Li Sun, Beijing (CN); Song Wang, Beijing (CN); Wei Fan, Beijing (CN); Jun Sun, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 939 days.

(21) Appl. No.: 15/799,533

(22) Filed: Oct. 31, 2017

(65) Prior Publication Data

US 2018/0157965 A1 Jun. 7, 2018

(30) Foreign Application Priority Data

Dec. 1, 2016 (CN) .......................... 201611095599.7

(51) Int. Cl.
*G06N 3/04* (2006.01)
*G06N 3/08* (2006.01)

(52) U.S. Cl.
CPC ............. *G06N 3/0454* (2013.01); *G06N 3/08* (2013.01)

(58) Field of Classification Search
CPC .............................. G06N 3/0454; G06N 3/08
See application file for complete search history.

(56) References Cited

U.S. PATENT DOCUMENTS

2010/0332422 A1* 12/2010 Cheng .................... G06N 20/00
706/12
2017/0243132 A1* 8/2017 Sainani ................... H04L 41/22
2017/0345130 A1 11/2017 Wang et al.

FOREIGN PATENT DOCUMENTS

CN 105243398 A 1/2016
WO 2016/132147 A1 8/2016

OTHER PUBLICATIONS

Thornton et al., "Auto-WEKA: Combined Selection and Hyperparameter Optimization of Classification Algorithms", Aug. 2013, KDD '13: Proceedings of the 19th ACM SIGKDD international conference on Knowledge discovery and data mining, pp. 847-855 (Year: 2013).*

(Continued)

*Primary Examiner* — Kamran Afshar
*Assistant Examiner* — Brent Johnston Hoover
(74) *Attorney, Agent, or Firm* — Staas & Halsey LLP

(57) ABSTRACT

A device for determining a CNN model for a database according to the present disclosure includes: a selecting unit configured to select at least two CNN models from multiple CNN models whose classification capacity is known; a fitting unit configured to fit, based on the classification capacity and first parameters of the at least two CNN models, a curve taking classification capacity and a first parameter as variables; a predicting unit configured to predict, based on the curve, a first parameter of other CNN models; and a determining unit configured to determine a CNN model applicable to the database from the multiple CNN models. With the device and the method according to the present disclosure, there is no need to train all the CNN models, thereby greatly reducing the amount of computation and simplifying the process of designing the CNN model.

17 Claims, 4 Drawing Sheets

(56) References Cited

OTHER PUBLICATIONS

Beckham et al., "Classification and regression algorithms for WEKA implemented in Python", Oct. 2015, Working Paper, University of Waikato, Department of Computer Science, pp. 1-15 (Year: 2015).*

Leite et al., "Predicting relative performance of classifiers from samples", Aug. 2005, ICML '05: Proceedings of the 22nd international conference on Machine learning, pp. 497-504 (Year: 2005).*

Smithson et al., "Neural Networks Designing Neural Networks: Multi-Objective Hyper-Parameter Optimization", Nov. 10, 2016, ICCAD '16, pp. 1-8 (Year: 2016).*

Chinese Office Action dated Apr. 25, 2021 from Chinese Application No. 201611095599.7, 17 pages, Bergstra et al., "Hyperopt: a Python library for model selection and hyperparameter optimization", Computational Science & Discovery, vol. 8, Jul. 28, 2015, pp. 1-24.

Talathi, "Hyper-Parameter Optimization of Deep Convolutional Networks for Object Recognition", arXiv, May 17, 2015, pp. 1-5.

\* cited by examiner

DEVICE AND METHOD FOR DETERMINING CONVOLUTIONAL NEURAL NETWORK MODEL FOR DATABASE

CROSS-REFERENCE TO RELATED APPLICATIONS

This application claims the benefit and priority of Chinese Application No. 2016110955 99.7, filed on Dec. 1, 2016, entitled "device and method for determining convolutional neural network model for database", the entire disclosure of which is incorporated herein by reference.

BACKGROUND

1. Field

The embodiments of the present disclosure relate to the field of machine learning, and in particular to a device and a method for determining a convolutional neural network (CNN) model for a database.

2. Description of the Related Art

The background part provides background information related to the present disclosure, which is not necessarily the conventional technology.

Deep learning technology has been widely applied in the field of computer vision. As one of the deep learning technology, a convolutional neural network (CNN) greatly improves accuracy of image classification and brings a qualitative change to an image classification task. A suitable CNN model can be designed for any database, and the CNN model can be used to train a sample in the database to obtain a link between the sample in the database and a label of the sample. Here, the sample in the database can be an image.

However, the design and selection for the CNN model require a professional background, and is not easy for an ordinary people. In addition, when determining the CNN model, it is generally desirable to select a CNN model with better performance, and a performance parameter of the CNN model is usually obtained by training. Therefore, in a case that there are a large number of candidate CNN models, each of the CNN models needs to be trained to obtain the performance parameter, and then the suitable CNN model is selected based on the performance parameter, which results in the increase of the amount of computation and prolonging processing time.

It is desirable in the present disclosure to propose a scheme, to simplify the process of determining the CNN model and reduce the amount of computation for selecting the CNN model, so that the CNN model can be easily determined by an ordinary people as a user.

SUMMARY

This summary part provides a general summary of the present disclosure, rather than discloses a full scope or all features thereof.

An object of the present disclosure is to provide a device and a method for determining a CNN model for a database, thereby simplifying the process of determining the CNN model and reducing the amount of computation for selecting the CNN model, so that the CNN model can be easily determined by an ordinary people as a user.

According to an aspect of the present disclosure, a device for determining a convolutional neural network (CNN) model for a database is provided, which includes: a selecting unit configured to select at least two CNN models from multiple CNN models whose classification capacity is known; a fitting unit configured to fit, based on the classification capacity and first parameters of the at least two CNN models, a curve taking classification capacity and the first parameter as variables, the first parameter being used for characterizing performance of the CNN model; a predicting unit configured to predict, based on the curve, a first parameter of a CNN model of the multiple CNN models other than the at least two CNN models; and a determining unit configured to determine a CNN model applicable to the database from the multiple CNN models based on the first parameter of each of the multiple CNN models.

According to another aspect of the present disclosure, a method for determining a convolution neural network (CNN) model for a database is provided, which includes: selecting at least two CNN models from multiple CNN models whose classification capacity is known; fitting, based on the classification capacity and first parameters of the at least two CNN models, a curve taking classification capacity and the first parameter as variables, the first parameter being used for characterizing performance of the CNN model; predicting, based on the curve, a first parameter of a CNN model in the multiple CNN models other than the at least two CNN models; and determining a CNN model applicable to the database from the multiple CNN models based on the first parameter of each of the multiple CNN models.

According to another aspect of the present disclosure, a program product including machine-readable instruction codes stored therein is provided, where when being read and executed by a computer, the instruction codes enables the computer to perform the method for determining a convolution neural network (CNN) model for a database according to the present disclosure.

According to another aspect of the present disclosure, a machine-readable storage medium on which a program product including the machine-readable instruction codes stored therein is carried is provided, where when being read and executed by a computer, the instruction codes enables the computer to perform the method for determining a convolution neural network (CNN) model for a database according to the present disclosure.

With the device and the method for determining a convolutional neural network (CNN) model for a database according to the present disclosure, a curve taking classification capacity and a performance parameter as variables can be fitted based on at least two CNN models, and a performance parameter of a CNN model other than the at least two CNN models may be predicted based on the fitted curve, and a suitable CNN model is selected based on the performance parameter. In this way, performance parameters of all the CNN models can be obtained only using the at least two CNN models without training all the CNN models, thereby greatly reducing the amount of computation and simplifying the process of designing the CNN model, so that the CNN model can be easily determined by an ordinary people as a user.

The description and specific examples in the summary are only illustrative and are not intended to limit the scope of the present disclosure.

BRIEF DESCRIPTION OF THE DRAWINGS

The drawings described herein are used for illustrating the selected embodiments, rather than all of the possible embodiments, and are not intended to limit the scope of the present disclosure. In the drawings.

Figure 1:
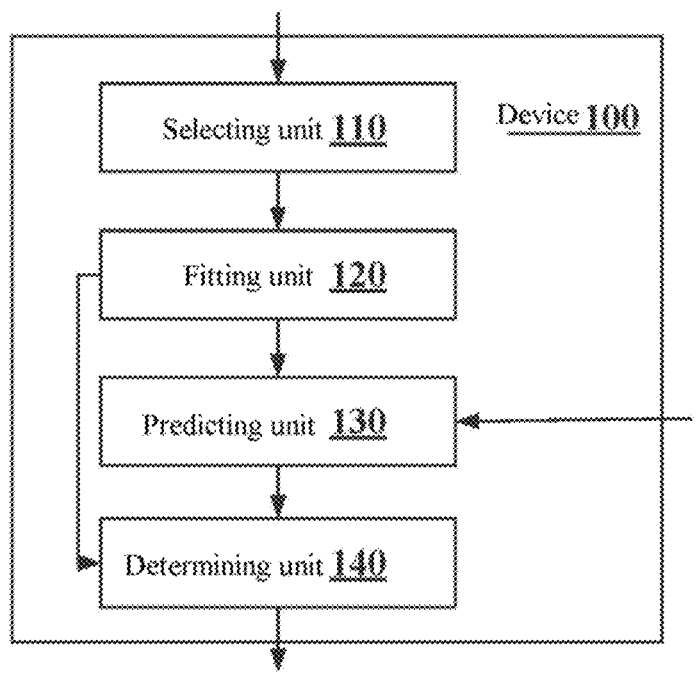
FIG. 1 is a structural block diagram showing a device for determining a CNN model for a database according to an embodiment of the present disclosure.

Although the present disclosure is susceptible to various modifications and substitutions, specific embodiments thereof are shown in the drawings as an example and are described in detail herein. However, it should be understood that the description for specific embodiments herein is not intended to limit the present disclosure into a disclosed particular form, but rather, the present disclosure aims to cover all modifications, equivalents and substitutions within the spirit and scope of the present disclosure. It should be noted that, throughout the drawings, a numeral indicates a component corresponding to the numeral.

DETAILED DESCRIPTION

Reference will now be made in detail to the embodiments, examples of which are illustrated in the accompanying drawings, wherein like reference numerals refer to the like elements throughout. The embodiments are described below by referring to the figures.

Examples of the present disclosure are described now more fully with reference to the drawings. The following description is merely exemplary substantively and is not intended to limit the present disclosure and an application or use thereof.

Exemplary embodiments are provided below to make the present disclosure thorough and convey a scope of the present disclosure to those skilled in the art. Examples of various specific details, such as specific elements, devices, and methods, are set forth to provide thorough understanding for the embodiments of the present disclosure. It is apparent to those skilled in the art that the exemplary embodiments may be embodied in multiple different forms without using specific details, and should not be construed as limiting the scope of the present disclosure. In some exemplary embodiments, well-known processes, well-known structures, and well-known technology are not described in detail.

A device 100 for determining a CNN model for a database according to an embodiment of the present disclosure is described below with reference to FIG. 1.

The device 100 for determining a CNN model for a database according to the present disclosure includes a selecting unit 110, a fitting unit 120, a predicting unit 130, and a determining unit 140.

According to an embodiment of the present disclosure, the selecting unit 110 may select at least two CNN models from multiple CNN models whose classification capacity is known. Here, the selecting unit 110 may obtain the multiple CNN models whose classification capacity is known from outside of the device 100 and select at least two CNN models from the multiple CNN models. Further, the selecting unit 110 may send the selected at least two CNN models to the fitting unit 120.

Classification capacity, as an important parameter of a CNN model, is used for characterizing capacity of the CNN model for classifying samples in the database. In general, with enhancement of the classification capacity of a CNN model, a more complex database can be processed by the CNN model. According to an embodiment of the present disclosure, classification capacity of each of the multiple CNN models is known, and the classification capacity of the CNN model can be obtained with any method in the art, which is not limited in the present disclosure.

Further, the multiple CNN models may be obtained by screening according to certain rules. For example, the classification capacity of the multiple CNN models is within a certain range. That is, the multiple CNN models are provided to the selecting unit 110 as the candidate CNN models, and the device 100 determines one or more suitable CNN models applicable to a specific database from the multiple CNN models.

According to the embodiment of the present disclosure, the fitting unit 120 may fit a curve taking classification capacity and a first parameter as variables based on the classification capacity and first parameters of the at least two CNN models. The first parameter is used for characterizing performance of the CNN model. Here, the fitting unit 120 may obtain the selected at least two CNN models from the selecting unit 110, and a parameter of the obtained at least two CNN models includes the classification capacity. Further, the fitting unit 120 may also obtain the first parameters of the at least two CNN models for representing the performance. For example, the fitting unit 120 may obtain the first parameters of the at least two CNN models from other unit inside the device 100 or other external device. Next, the fitting unit 120 may fit the curve based on the classification capacity and the first parameters of the at least two CNN models. Further, the fitting unit 120 may send the fitted curve to the predicting unit 130 and may send to the determining unit 140 the at least two CNN models, the parameter of which includes the first parameters.

According to the embodiment of the present disclosure, the predicting unit 130 may predict a first parameter of a CNN model of the multiple CNN models other than the at least two CNN models based on the curve. Here, the predicting unit 130 may obtain the fitted curve from the fitting unit 120 and may obtain a CNN model of the multiple CNN models other than the at least two CNN models from outside of the device 100. The classification capacity of the other CNN model is known, and the first parameter of the other CNN model is unknown. Next, the predicting unit 130 may predict the first parameter of the other CNN model using the fitted curve. Further, the predicting unit 130 may send the other CNN model (a parameter of the other CNN model includes the predicted first parameter) to the determining unit 140.

According to the embodiment of the present disclosure, the determining unit 140 may determine a CNN model applicable to the database from the multiple CNN models based on the first parameter of each of the multiple CNN models. Here, the determining unit 140 may obtain from the predicting unit 130 the CNN model other than the at least two CNN models, the parameter of which includes the predicted first parameter, and obtain from the fitting unit 120 the at least two CNN models, the parameter of which includes the first parameters. In this way, the determining unit 140 obtains all the CNN models and knows the first parameters of the CNN models. Next, the determining unit 140 may determine the CNN model applicable to the database based on the first parameters of all the CNN models. According to the embodiment of the present disclosure, the determining unit 140 may determine one or more CNN models, and a selecting rule may be set according to actual situations. Further, the determining unit 140 may output the determined CNN model from the device 100.

As described above, an input of the device 100 is multiple CNN models whose classification capacity is known, and an output of the device 100 is a suitable CNN model for a certain database.

Figure 2:
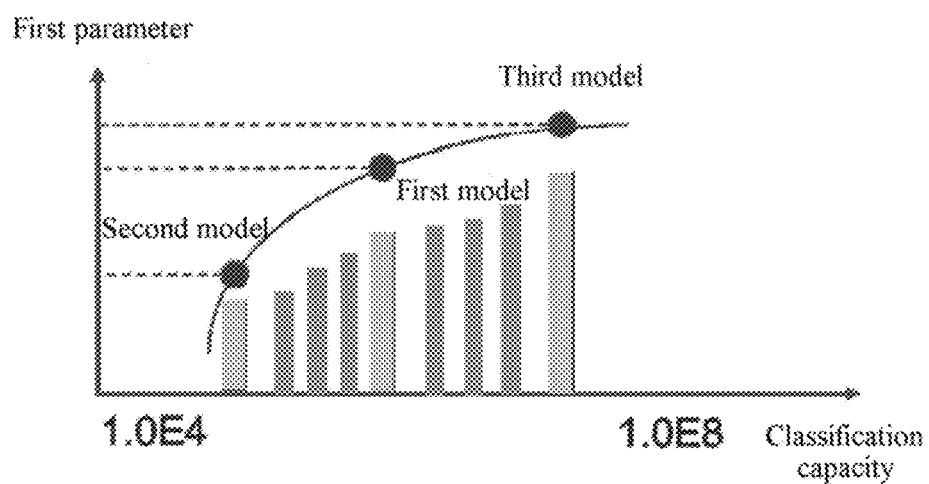
FIG. 2 shows a curve taking classification capacity and a first parameter as variables according to an embodiment of the present disclosure.

FIG. 2 shows a curve taking classification capacity and a first parameter as variables according to an embodiment of the present disclosure. As shown in FIG. 2, the horizontal axis represents classification capacity of a CNN model, and the vertical axis represents a first parameter of a CNN model. The curve in FIG. 2 is a curve taking classification capacity and a first parameter as variables fitted by the fitting unit 120. It should be noted that, although the selecting unit 110 selects three CNN models (a first model, a second model and a third model) in FIG. 2, the selecting unit 110 may select two CNN models or more than three CNN models.

It can be seen that, with the device 100 for determining a convolutional neural network (CNN) model for a database according to the present disclosure, a curve taking classification capacity and a performance parameter as variables may be fitted based on at least two CNN models, and a performance parameter of the CNN model other than the at least two CNN models may be predicted based on the fitted curve, and a suitable CNN model is selected based on the performance parameter. In this way, performance parameters of all the CNN models can be obtained only using the at least two CNN models without training all the CNN models, thereby greatly reducing the amount of computation and simplifying the process of designing the CNN model, so that the CNN model can be easily determined by an ordinary people as a user.

Selecting Unit 110

Figure 3:
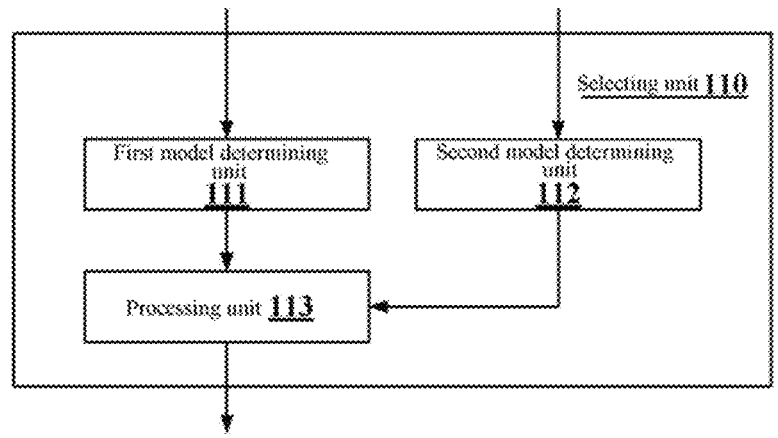
FIG. 3 is a structural block diagram showing a selecting unit in a device for determining a CNN model for a database according to an embodiment of the present disclosure.

FIG. 3 is a structural block diagram showing the selecting unit 110 in the device 100 for determining a CNN model for a database according to an embodiment of the present disclosure.

As shown in FIG. 3, the selecting unit 110 includes a first model determining unit 111, a second model determining unit 112 and a processing unit 113.

According to the embodiment of the present disclosure, the first model determining unit 111 may determine the model whose classification capacity best matches the database from the multiple CNN models as a first model. Here, the classification capacity of the first model best matches the database. In other words, the first model is most suitable to train the database, which can neither cause "wasting" due to over high classification capacity, nor fails to process the database due to poor classification capacity. According to the embodiment of the present disclosure, the classification capacity that best matches a specific database may be determined with any suitable method. For example, the classification capacity that best matches the database is determined based on the database itself, or the classification capacity that may best matches the database is determined based on classification capacity of all of the multiple CNN models, which is not limited in the present disclosure. Here, the first model determining unit 111 may obtain the multiple CNN models from outside of the device 100 and determine the first model from the multiple CNN models, and then may send the first model to the processing unit 113.

According to the embodiment of the present disclosure, the second model determining unit 112 may determine the model whose classification capacity is the poorest from the multiple CNN models as a second model. Here, the second model determining unit 112 may obtain the multiple CNN models from outside of the device 100 and determine the second model from the multiple CNN models, and then may send the second model to the processing unit 113.

According to the embodiment of the present disclosure, the processing unit 113 may determine the at least two CNN models, and the at least two CNN models include the first model and the second model. According to the embodiment of the present disclosure, the processing unit 113 may obtain the first model from the first model determining unit 111 and may obtain the second model from the second model determining unit 112, to determine the at least two CNN models. According to the embodiment of the present disclosure, the at least two CNN models may include the first model and the second model if the number of the determined at least two CNN models is two or more.

As shown in FIG. 2, a second model on the left may be the second model determined by the second model determining unit 112, and a first model in the middle may be the first model determined by the first model determining unit 111.

Figure 4:
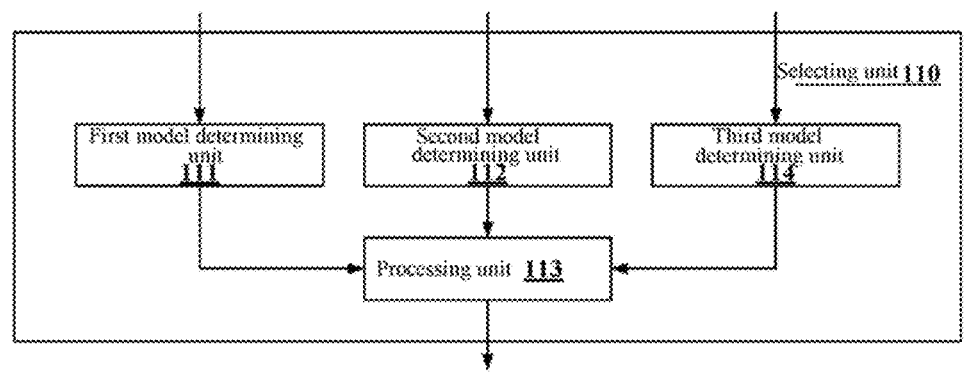
FIG. 4 is a structural block diagram showing a selecting unit in a device for determining a CNN model for a database according to another embodiment of the present disclosure.

FIG. 4 shows a structural block diagram of the selecting unit 110 in the device 100 for determining a CNN model for a database according to another embodiment of the present disclosure.

As shown in FIG. 4, the selecting unit 110 may include a first model determining unit 111, a second model determining unit 112, a third model determining unit 114 and a processing unit 113. The first model determining unit 111, the second model determining unit 112, and the processing unit 113 have been described above in detail, and will not be described again.

According to the embodiment of the present disclosure, the third model determining unit 114 may determine the model whose classification capacity is the best from the multiple CNN models as a third model. Here, the third model determining unit 114 may obtain the multiple CNN models from outside of the device 100 and determine the third model from the multiple CNN models, and then may send the third model to the processing unit 113.

As shown in FIG. 2, a third model on the right may be the third model determined by the third model determining unit 114.

According to the embodiment of the present disclosure, the at least two CNN models determined by the processing unit 113 may further include the third model. That is, the at least two CNN models may include the first model, the second model, and the third model if the number of the determined at least two CNN models is three or more. More specifically, the at least two CNN models includes the first model and the second model if the number of the determined at least two CNN models is 2, and the at least two CNNs models includes the first model, the second model and the third model if the number of the determined at least two CNN models is 3.

According to the embodiment of the present disclosure, the processing unit 113 may determine the number of the selected CNN models according to practical needs. With the increase of the number of the selected CNN models, precision of the curve fitted by the fitting unit 120 increases, and the amount of the computation required by the fitting increases.

Training Unit 150

Figure 5:
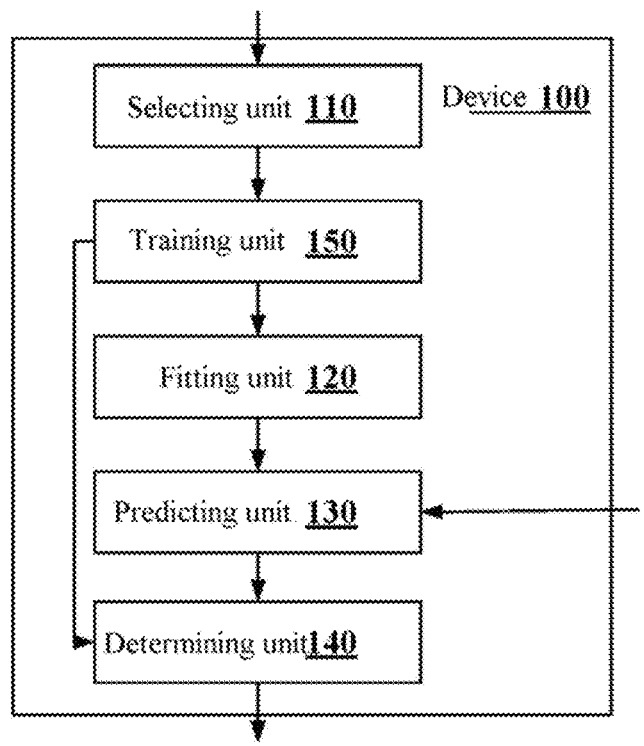
FIG. 5 is a structural block diagram showing a device for determining a CNN model for a database according to another embodiment of the present disclosure.

FIG. 5 shows a structural block diagram of the device 100 for determining a CNN model for a database according to another embodiment of the present disclosure.

As shown in FIG. 5, the device 100 may include a selecting unit 110, a fitting unit 120, a predicting unit 130, a determining unit 140 and a training unit 150. The selecting unit 110, the fitting unit 120, the predicting unit 130 and the determining unit 140 may be the same as the those shown in FIG. 1, which are not be described repeatedly here.

According to the embodiment of the present disclosure, the training unit 150 may train each of the at least two CNN models to obtain the first parameter of each CNN model. Here, the training unit 150 may obtain the selected at least two CNN models from the selecting unit 110 and obtain the first parameter of each of the at least two CNN models by means of training. Next, the training unit 150 may send to the fitting unit 120 the at least two CNN models, a parameter of which includes the first parameters, for fitting the curve. Further, the training unit 150 may also send to the determining unit 140 the at least two CNN models, the parameter of which includes the first parameters, for selecting the CNN model.

According to the embodiment of the present disclosure, the performance parameter of the CNN model can be acquired by training the CNN model with multiple methods, which is not limited in the present disclosure. For example, the CNN model is trained with a training database whose sample labels are known, and a sample label output by the CNN model is compared with a true sample label to obtain the performance parameter of the CNN model.

Fitting Unit 120

According the an embodiment of the present disclosure, the fitting unit 120 obtains at least two points in a two-dimensional coordinate system after obtaining the first parameters and the classification capacity of the at least two CNN models, and then fits a curve in the two-dimensional coordinate system in any ways. For example, the fitting unit 120 may fit the curve by means of a power exponent function $y=ax^b$ or a logarithmic function $y=c\ln(x)+d$, where a, b, c, and d are parameters to be solved.

FIG. 2 shows the curve fitted by the fitting unit 120. As shown in FIG. 2, the classification capacity and the first parameters of the selected three models are represented as three points in the two-dimensional coordinate system, and the fitted curve passes through the three points.

Predicting Unit 130

According to the embodiment of the present disclosure, the predicting unit 130 may predict a first parameter of the CNN model other than the at least two CNN models based on the curve fitted by the fitting unit 120. That is, the first parameter of the other CNN model is predicted based on the curve fitted by the fitting unit 120 and the classification capacity of the other CNN model. For example, for each of the CNN model other than the at least two CNN models, the predicting unit 130 searches the curve for a point whose abscissa is the classification capacity of the CNN model and predicts the ordinate of the point as the first parameter of the CNN model.

Taking the example shown in FIG. 2 as an example, after the curve is fitted, for any CNN model other than the at least two CNN models whose classification capacity is known, the horizontal axis is searched for the classification capacity of the CNN model, to determine a point whose abscissa is the classification capacity, and the ordinate corresponding to the point is a first parameter of the CNN model predicted by the predicting unit 130.

According to the embodiment of the present disclosure, the classification capacity of all of the multiple CNN models inputted to the device 100 is known, the first parameters of the at least two CNN models selected by the selecting unit 110 are obtained by training through the training unit 150, and the first parameter of the CNN model other than the at least two CNN models not selected by the selecting unit 110 is predicted by the predicting unit 130 without the training process. It is well known that it takes a long time to train a CNN model. With the embodiment of the present disclosure, the performance parameter can be obtained without training all the CNN models, thereby reducing processing time.

Determining Unit 140

According to the embodiment of the present disclosure, the determining unit 140 may determine one or more CNN models for the database from the multiple CNN models based on the first parameter. That is, the determining unit 140 may determine the CNN model only based on the first parameter, or may also determine the CNN model based on other parameter except the first parameter. According to the embodiment of the present disclosure, the determining unit 140 may determine the CNN model with various implementations. For example, the determining unit 140 selects the CNN model, the first parameter of which is optimal, or selects the CNN model, the first parameter of which is within a predetermined range, and the like, which is not limited in the present disclosure.

According to the embodiment of the present disclosure, the determining unit 140 may also determine the CNN model applicable to the database from the multiple CNN models based on the first parameter and a second parameter of each of the multiple CNN models. The second parameter is used for characterizing performance of the CNN model.

There are many kinds of parameters for characterizing the performance of the CNN model, and the parameters are used for describing the performance of the CNN model from multiple perspectives. The determining unit 140 may determine the CNN model based on multiple parameters, so that the performance of the determined CNN model is good from different perspectives.

In the example shown in FIG. 2, the histogram represents the second parameter of the CNN model. Each histogram represents one CNN model, and FIG. 2 shows nine CNN models in total. The height of the histogram represents the size of the second parameter of the CNN model. The height may be obtained by normalization or other pre-processing process. In FIG. 2, the first parameter of the first model, the first parameter of the second model and the first parameter of the third model are obtained by training, and the first parameters of other six CNN models are predicted by the predicting unit 130 based on the fitted curve in FIG. 2. The second parameter may be obtained with any methods, which is not limited in the present disclosure. In this way, the user can clearly know the first parameter and the second parameter of each of the CNN models from FIG. 2, so that the final CNN model is determined taking both the first parameter and the second parameter into account. According to the embodiment of the present disclosure, the determining unit 140 may select the CNN model based on the first parameter and the second parameter according to a predetermined criterion and an algorithm, which is not limited in the present disclosure.

First Parameter and Second Parameter

According to the embodiment of the present disclosure, the first parameter may include a parameter for characterizing classification precision of the CNN model. For example, the first parameter may be a classification accuracy ratio parameter and a feature extraction accuracy parameter, and the like, as long as it can characterize the classification precision of the CNN model. Here, the classification precision of the CNN model represents the accuracy of classification of the CNN model, and reflects feature representation capacity of the CNN model to a certain extent.

According to the embodiment of the present disclosure, the second parameter may include a parameter for characterizing a calculation speed of the CNN model or a parameter for characterizing a memory occupancy rate of the CNN model. For example, the parameter for characterizing the calculation speed of the CNN model may include the number of floating-point calculation of the CNN model. The number of floating-point calculation reflects time consumed for a testing process. The time consumed for the testing increases with the increase of the number of floating-point calculation.

According to the embodiment of the present disclosure, the second parameter may further include a parameter for characterizing model stability of the CNN model and the like. A user or a designer of the CNN model can select a suitable second parameter according to practical needs.

In practical, the determining unit 140 may also determine the CNN model based on other parameter except the first parameter and the second parameter without departing from the spirit of the present disclosure, in this case, more factors are considered synthetically, so that the performance of the determined CNN model is good from more performance perspectives.

As described above, with the device for determining a convolutional neural network (CNN) model for a database according to the present disclosure, a curve taking classification capacity and performance parameter as variables may be fitted based on at least two CNN models, and then a performance parameter of the CNN model other than the at least two CNN models may be predicted based on the fitted curve, and a suitable CNN model is selected based on the performance parameter. In this way, the performance parameters of all the CNN models can be obtained only using the at least two CNN models without training all the CNN models, thereby greatly reducing the amount of computation.

The device 100 for determining a CNN model for a database according to an embodiment of the present disclosure is described in detail above. Next, a method for determining a CNN model for a database according to an embodiment of the present disclosure is described next in detail.

Figure 6:
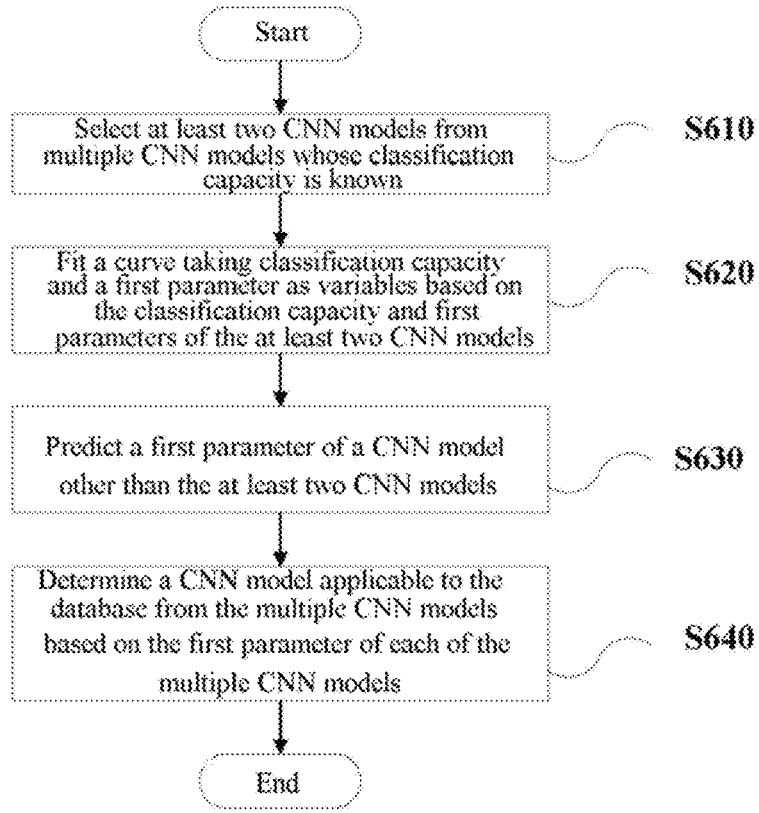
FIG. 6 is a flow chart of a method for determining a CNN model for a database according to an embodiment of the present disclosure.

FIG. 6 is a flowchart of a method for determining a CNN model for a database according to an embodiment of the present disclosure.

As shown in FIG. 6, at step S610, at least two CNN models are selected from multiple CNN models whose classification capacity is known.

Next, in step S620, a curve using classification capacity and a first parameter as variables is fitted based on the classification capacity and first parameters of the at least two CNN models. The first parameter is used for characterizing performance of the CNN model.

Next, in step S630, a first parameter of a CNN model of the multiple CNN models other than the at least two CNN models is predicted based on the curve.

Next, in step S640, a CNN model applicable to the database is determined from the multiple CNN models based on the first parameter of each of the multiple CNN models.

Preferably, selecting the at least two CNN models includes: determining the model whose classification capacity best matches the database from the multiple CNN models as a first model; determining the model whose classification capacity is the poorest from the multiple CNN models as a second model; and determining the at least two CNN models. The at least two CNN models include the first model and the second model.

Preferably, selecting the at least two CNN models further includes: determining a model whose classification capacity is the best from the multiple CNN models as a third model, and the at least two CNN models further include the third model.

Preferably, the method further includes: training each of the at least two CNN models to obtain the first parameter of the CNN model.

Preferably, the curve is fitted by means of a power exponential function or a logarithmic function.

Preferably, the first parameter includes a parameter for characterizing classification precision of the CNN model.

Preferably, determining the CNN model applicable to the database includes: determining the CNN model applicable to the database from the multiple CNN models based on the first parameter and a second parameter of each of the multiple CNN models, the second parameter being used for characterizing performance of the CNN model.

Preferably, the second parameter includes a parameter for characterizing a calculation speed of the CNN model or a parameter for characterizing a memory occupancy rate of the CNN model.

Preferably, the parameter for characterizing the calculation speed of the CNN model includes the number of floating-point calculation of the CNN model.

The method for determining a CNN model for a database described above can be implemented by the device 100 for determining a CNN model for a database according to the embodiment of the present disclosure, and thus various embodiments of the device 100 for determining a CNN model for a database described above are applicable to the method, which is not be described repeatedly here anymore.

As can be seen, with the device and the method for determining a convolutional neural network (CNN) model for a database according to the present disclosure, a curve taking classification capacity and a first parameter as variables may be fitted based on at least two CNN models, and a performance parameter of the CNN model other than the at least two CNN models may be predicted based on the fitted curve, and a suitable CNN model is selected based on the performance parameter. In this way, the performance parameters of all the CNN models can be obtained only using at least two CNN models without training all of the CNN models, thereby greatly reducing the amount of computation and simplifying the process of designing the CNN model, so that the CNN model can be easily determined by an ordinary people as a user.

It will be apparent that various operations of the method for determining a CNN model for a database according to the present disclosure may be implemented in a manner of computer-executable programs stored in various machine-readable storage mediums.

In addition, the object of the present disclosure can also be achieved by: directly or indirectly providing a storage medium including the executable program codes stored therein to a system or device; and reading and executing the above program codes by a computer, a central processing unit (CPU) or an image processing unit (GPU) in the system or the device. As long as the system or the device has a function of executing a program, the embodiment of the present disclosure is not limited to the program, and the program may be any form such as a target program, a program executed by an interpreter or a script program provided to the operating system.

The above machine-readable storage mediums include but are not limited to, various memory and storage units, semiconductor devices, disk units such as an optical disk, a magnetic disk and a magneto-optical disk, and other medium suitable for storing information.

In addition, the computer may also implement the technical solution of the present disclosure by connecting to a website on the Internet, downloading and installing the computer program codes according to the present disclosure to a computer and executing the program codes.

Figure 7:
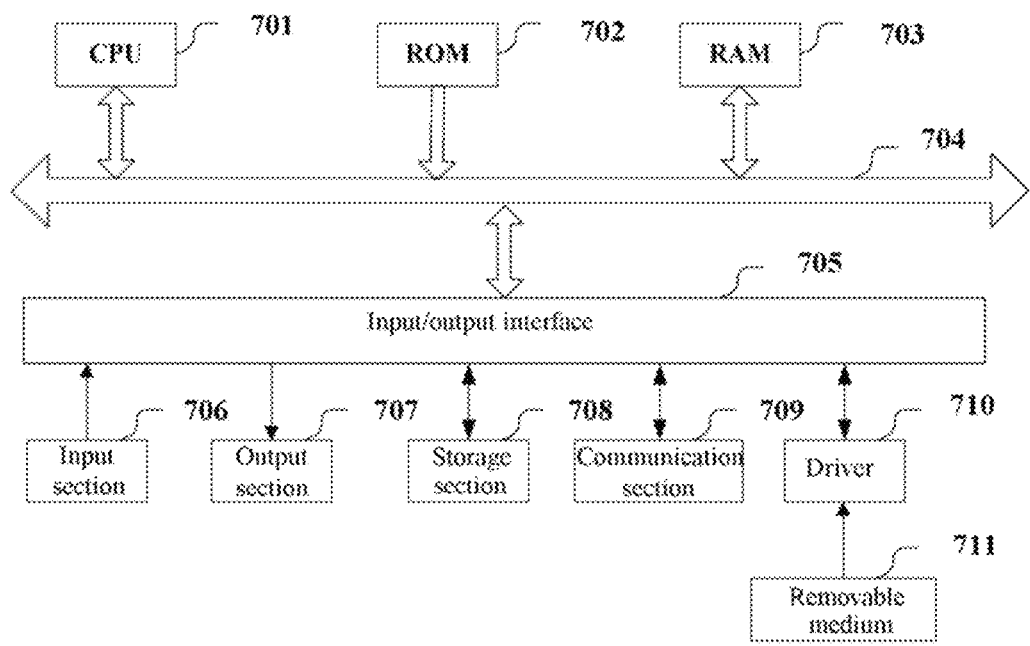
FIG. 7 is a block diagram of an exemplary structure of a general purpose personal computer in which a method for determining a CNN model for a database according to the present disclosure can be implemented.

FIG. 7 is a block diagram of an exemplary structure of a general purpose personal computer in which a method for determining a CNN model for a database according to the present disclosure can be implemented.

As shown in FIG. 7, a CPU 701 performs various processing according to a program stored in a read-only memory (ROM) 702 or a program loaded to a random access memory (RAM) 703 from the storage section 708. Data required for various processing of the CPU 701 is also stored in the RAM 703 as needed. The CPU 701, the ROM 702, and the RAM 703 are connected to each other via a bus 704. An input/output interface 705 is also connected to the bus 704.

The following components are connected to the input/output interface 705: an input section 706 (including a keyboard, a mouse, etc.), an output section 707 (including a display such as a cathode ray tube (CRT), a liquid crystal display (LCD)), and a loudspeaker, etc.), a storage section 708 (including a hard disk, etc.), a communication section 709 (including a network interface card such as a LAN card, a modem, etc.). The communication section 709 performs communication processing via a network such as the Internet. A driver 710 may also be connected to the input/output interface 705 as needed. A removable medium 711 such as a magnetic disk, an optical disk, a magneto-optical disk, a semiconductor memory is installed in the driver 710 as needed, so that a computer program read therefrom is installed in the storage section 708 as needed.

In a case that the above-described series of processing are implemented with software, a program constituting the software is installed from a network such as the Internet or a non-transitory computer readable storage medium, such as the removable medium 711.

It will be understood by those skilled in the art that the storage medium is not limited to the removable medium 711 shown in FIG. 7, which has a program stored therein and is distributed separately from the device to provide the program to the user. An example of the removable medium 711 includes a magnetic disk (including a floppy disk (registered trademark)), an optical disk (including a compact disk read only memory (CD-ROM) and a digital versatile disk (DVD)), a magneto-optical disk (including a mini-disc (MD) (registered trademark)) and a semiconductor memory. Alternatively, the storage medium may be a ROM 702, a hard disk included in the storage section 708, etc., which has a program stored therein and is distributed to the user along with a device in which they are incorporated.

In the device and the method of the present disclosure, it is apparent that each unit or step can be decomposed and/or recombined. These decomposition and/or recombination shall be considered as equivalents of the present disclosure. Also, steps for executing the above-described series of processing can be naturally performed in chronological order in the order described, but are not necessarily performed in chronological order. Some steps may be performed in parallel or independently from each other.

Although the embodiments of the present disclosure have been described above in detail with reference to the drawings, it should be understood that the above-described embodiments are merely used for illustrating the present disclosure and are not intended to limit the present disclosure. Those skilled in the art can make various modifications and variations to the above-described embodiments without departing from the substance and scope of the present disclosure. Accordingly, the scope of the present disclosure is defined only by the appended claims and their equivalents.

With respect to embodiments including the above embodiments, the following notes are also disclosed:

(1) A device for determining a convolutional neural network (CNN) model for a database, including:

a selecting unit configured to select at least two CNN models from multiple CNN models whose classification capacity is known;

a fitting unit configured to fit, based on the classification capacity and first parameters of the at least two CNN models, a curve taking classification capacity and the first parameter as variables, the first parameter being used for characterizing performance of the CNN model;

a predicting unit configured to predict, based on the curve, a first parameter of a CNN model of the multiple CNN models other than the at least two CNN models; and a determining unit configured to determine a CNN model applicable to the database from the multiple CNN models based on the first parameter of each of the multiple CNN models.

(2) The device according to (1), wherein the selecting unit further includes:

a first model determining unit configured to determine, from the multiple CNN models, the model whose classification capacity best matches the database as a first model;

a second model determining unit configured to determine, from the multiple CNN models, the model whose classification capacity is the poorest as a second model; and a processing unit configured to determine the at least two CNN models, where the at least two CNN models include the first model and the second model.

(3) The device according to (2), wherein the selecting unit further includes a third model determining unit configured to determine, from the multiple CNN models, the model whose classification capacity is the best as a third model, and the at least two CNN models determined by the processing unit further include the third model.

(4) The device according to any of (1) to (3), further including:

a training unit configured to train each of the at least two CNN models, to obtain the first parameter of each CNN model.

(5) The device according to any of (1) to (3), wherein the fitting unit is configured to fit the curve by means of a power exponent function or a logarithmic function.

(6) The device according to any one of (1) to (3), wherein the first parameter includes a parameter for characterizing classification precision of the CNN model.

(7) The device according to any one of (1) to (3), wherein the determining unit is further configured to determine, from the multiple CNN models, the CNN model applicable to the database based on the first parameter and a second parameter of each of the multiple CNN models, the second parameter being used for characterizing performance of the CNN model.

(8) The device according to (7), wherein the second parameter includes a parameter for characterizing a calculation speed of the CNN model or a parameter for characterizing a memory occupancy rate of the CNN model.

(9) The device according to (8), wherein the parameter for characterizing the calculation speed of the CNN model includes the number of floating-point calculation of the CNN model.

(10) A method for determining a convolutional neural network (CNN) model for a database, including:
selecting at least two CNN models from multiple CNN models whose classification capacity is known;
fitting, based on the classification capacity and first parameters of the at least two CNN models, a curve taking classification capacity and the first parameter as variables, the first parameter being used for characterizing performance of a CNN model;
predicting, based on the curve, a first parameter of a CNN model of the multiple CNN models other than the at least two CNN models; and
determining a CNN model applicable to the database from the multiple CNN models based on the first parameter of each of the multiple CNN models.

(11) The method according to (10), wherein the selecting the at least two CNN models includes:
determining, from the multiple CNN models, the model whose classification capacity best matches the database as a first model;
determining, from the multiple CNN models, the model whose classification capacity is the poorest as a second model; and
determining the at least two CNN models, where the at least two CNN models include the first model and the second model.

(12) The method according to (11), wherein the selecting the at least two CNN models further includes:
determining, from the multiple CNN models, the model whose classification capacity is the best as a third model, and the at least two CNN models further include the third model.

(13) The method according to any one of (10) to (12), further including:
training each of the at least two CNN models, to obtain the first parameter of each CNN model.

(14) The method according to any one of (10) to (12), wherein the curve is fitted by means of a power exponent function or a logarithmic function.

(15) The method according to any one of (10) to (12), wherein the first parameter includes a parameter for characterizing classification precision of the CNN model.

(16) The method according to any one of (10) to (12), wherein the determining the CNN model applicable to the database includes:
determining, from the multiple CNN models, the CNN model applicable to the database based on the first parameter and a second parameter of each of the multiple CNN models, the second parameter being used for characterizing performance of the CNN model.

(17) The method according to (16), wherein the second parameter includes a parameter for characterizing a calculation speed of the CNN model or a parameter for characterizing a memory occupancy rate of the CNN model.

(18) The method according to (17), wherein the parameter for characterizing the calculation speed of the CNN model includes the number of floating-point calculation of the CNN model.

(19) A machine-readable storage medium in which a program product including machine-readable instruction codes stored therein is carried, where when being read and executed by a computer, the machine-readable instruction codes enables the computer to perform the method according to any one of (10) to (18).

What is claimed is:

1. A device for determining a convolutional neural network (CNN) model for a database, comprising:
a processor configured to
select at least two CNN models from multiple CNN models whose classification capacity is known,
train the at least two CNN models to obtain first parameters of the at least two CNN models, respectively,
fit, based on the classification capacity and the first parameters of the at least two CNN models, a curve taking the classification capacity and the first parameters as variables, the first parameters characterizing performance of the at least two CNN models, respectively,
predict, based on the curve, a first parameter of each of the multiple CNN models other than the at least two CNN models, and
determine an applicable CNN model applicable to the database from the multiple CNN models based on the first parameters of the multiple CNN models.

2. The device according to claim 1, wherein the processor is further configured to
determine, from the multiple CNN models, a first model among the multiple CNN models having a first classification capacity that best matches the database,
determine a second model from among the multiple CNN models, having a second classification capacity that is poorest,
determine the at least two CNN models, where the at least two CNN models include the first model and the second model.

3. The device according to claim 2, wherein the processor is further configured to determine, from the multiple CNN models, a third model having a third classification capacity that is best, and the at least two CNN models determined by the processor further include the third model.

4. The device according to claim 1, wherein the processor is further configured to fit the curve by one of a power exponent function and a logarithmic function.

5. The device according to claim 1, wherein the first parameter includes a precision parameter for characterizing classification precision of the CNN model.

6. The device according to claim 1, wherein the processor is further configured to determine, from the multiple CNN models, the applicable CNN model applicable to the database based on the first parameter and a second parameter of each of the multiple CNN models, the second parameter being used for characterizing performance of each of the multiple CNN models.

7. The device according to claim 6, wherein the second parameter includes one of a speed parameter for characterizing a calculation speed of each of the multiple CNN models and an occupancy rate parameter for characterizing a memory occupancy rate of each of the multiple CNN models.

8. The device according to claim 7, wherein the speed parameter for characterizing the calculation speed of each of the multiple CNN models includes a number of floating-point calculations of each of the multiple CNN models.

9. A method for determining a convolutional neural network (CNN) model for a database, comprising:
   selecting at least two CNN models from multiple CNN models whose classification capacity is known;
   training each of the at least two CNN models, to obtain the first parameters of the at least two CNN models, respectively;
   fitting, based on the classification capacity and the first parameters of the at least two CNN models, a curve taking the classification capacity and the first parameters as variables, the first parameters characterizing performance of the CNN model;
   predicting, based on the curve, a first parameter of each of the multiple CNN models other than the at least two CNN models; and
   determining an applicable CNN model applicable to the database from the multiple CNN models based on the first parameter of each of the multiple CNN models.

10. The method according to claim 9, wherein the selecting the at least two CNN models includes:
    determining, from the multiple CNN models, a first model having a first classification capacity that best matches the database;
    determining, from the multiple CNN models, a second model having a second classification capacity that is poorest; and
    determining the at least two CNN models, where the at least two CNN models include the first model and the second model.

11. The method according to claim 10, wherein the selecting the at least two CNN models further includes:
    determining, from the multiple CNN models, one of the models whose classification capacity is a best as a third model, and the at least two CNN models further include the third model.

12. The method according to claim 9, wherein the curve is fitted by one of a power exponent function and a logarithmic function.

13. The method according to claim 9, wherein the first parameter includes a precision parameter for characterizing classification precision of the CNN model.

14. The method according to claim 9, wherein the determining the CNN model applicable to the database includes:
    determining, from the multiple CNN models, the applicable CNN model applicable to the database based on the first parameter and a second parameter of each of the multiple CNN models, the second parameter being used for characterizing performance of each of the multiple CNN models.

15. The method according to claim 14, wherein the second parameter includes one of a speed parameter for characterizing a calculation speed of each of the multiple CNN models and an occupancy rate parameter for characterizing a memory occupancy rate of each of the multiple CNN models.

16. The method according to claim 15, wherein the speed parameter for characterizing the calculation speed of each of the multiple CNN models includes a number of floating-point calculations of each of the multiple CNN models.

17. A non-transitory machine-readable storage medium in which a program product including machine-readable instruction codes stored therein is carried, wherein when being read and executed by a computer, the machine-readable instruction codes enables the computer to perform the method according to claim 9.

* * * * *